(12) United States Patent
Ratajski et al.

(10) Patent No.: US 7,828,106 B1
(45) Date of Patent: Nov. 9, 2010

(54) VEHICLE ROLLOVER CUSHIONING DEVICE

(75) Inventors: Daniel James Ratajski, Livonia, MI (US); William Harris Blackbird, Jr., Chesterfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 12/106,388

(22) Filed: Apr. 21, 2008

(51) Int. Cl.
*B60R 21/213* (2006.01)
*B60R 21/233* (2006.01)

(52) U.S. Cl. .................... 180/282; 280/730.1; 280/756; 280/729; 180/274; 296/187.03; 296/187.13; 296/210

(58) Field of Classification Search .............. 280/728.1, 280/730.1, 156, 729, 76; 180/282, 274, 271; 296/187.03, 187.06, 187.13, 210, 214, 212, 296/FOR. 112, FOR. 113
See application file for complete search history.

(56) References Cited

U.S. PATENT DOCUMENTS

| | | | |
|---|---|---|---|
| 5,959,552 A | 9/1999 | Cho | |
| 6,257,616 B1 * | 7/2001 | Nowak et al. ............ | 280/730.2 |
| 6,827,171 B2 | 12/2004 | Igawa | |
| 6,883,631 B2 * | 4/2005 | Hu et al. ................. | 180/274 |
| 6,988,578 B2 | 1/2006 | Kikuchi et al. | |
| 7,174,986 B2 * | 2/2007 | Takimoto .................. | 180/274 |
| 7,390,014 B2 * | 6/2008 | Takimoto .................. | 280/730.1 |
| 2004/0160050 A1 | 8/2004 | Strong | |
| 2005/0248184 A1 | 11/2005 | Piffaretti | |
| 2006/0043712 A1 * | 3/2006 | Hakki et al. .............. | 280/735 |
| 2006/0169517 A1 * | 8/2006 | Mishra ...................... | 180/274 |
| 2007/0052226 A1 * | 3/2007 | Tobaru et al. ............. | 280/756 |

FOREIGN PATENT DOCUMENTS

| | | | |
|---|---|---|---|
| DE | 198 03 165 A1 | * | 7/1999 |
| DE | 102 03 287 A1 | * | 8/2003 |
| DE | 10 2006 042375 A1 | * | 3/2008 |
| JP | 2006-76448 A | * | 3/2006 |

OTHER PUBLICATIONS

ConsumerReports.org, Guide to Safety Features, http://editorial.autos.msn.com, pp. 1-4, 1-6, Mar. 20, 2008.
ConsumerReports.org, IIHS crash tests, www.consumerreports.org, p. 1, Mar. 20, 2008.

* cited by examiner

*Primary Examiner*—Ruth Ilan
(74) *Attorney, Agent, or Firm*—Frederick Owens; Brooks Kushman P.C.

(57) ABSTRACT

An exterior deployed air bag system or protective system is disclosed for an automotive vehicle. Air bag assemblies are assembled to the roof below the access openings. The access openings are normally covered by a closure element. In the event of a potential rollover incident, an air bag may be deployed from the air bag assembly through the access opening in a weld seam area and expand when inflated outboard of the roof or side assembly of the vehicle.

16 Claims, 2 Drawing Sheets

VEHICLE ROLLOVER CUSHIONING DEVICE

BACKGROUND OF THE INVENTION

1. Field of the Invention

The present invention relates to air bag mechanisms that are stored within a vehicle, deployed through a weld seam area of a vehicle roof and outside the vehicle roof.

2. Background Art

Air bags are generally deployed within the interior of a vehicle to protect vehicle occupants in an accident. Interiorly deployed air bags are known that deploy from the dashboard, steering wheel, seat, headliner, and roof support pillars of vehicles.

U.S. Pat. No. 6,827,171 to Igawa discloses an externally developed air bag device that is deployed along an outer surface of the vehicle from a location forward of the windshield to protect a pedestrian who may hit by a car in a vehicle/pedestrian collision event.

U.S. Pat. No. 6,883,631 discloses an externally deployed air bag that may be deployed to protect the occupants of a vehicle from a side impact. The air bags are mounted near the vehicle doors and are deployed laterally outboard of the vehicle doors to defect an object impact away from vehicle occupants.

U.S. Pat. No. 7,174,986 discloses an externally developed air bag mechanism that is mounted to a vehicle adjacent the side and lower periphery of a vehicle windshield and inflates the air bag along the exterior of the motor vehicle. The purpose of this air bag mechanism is to protect pedestrians, bicycle riders, or motorcycle drivers in the event of a collision.

Patent Application Publication No. 2004/0160050 discloses an external protection system for a vehicle wherein guard rails are attached to the body of a vehicle outboard of the exterior of the passenger compartment. The guard rails may be provided on the sides, front, and rear of the vehicle.

Patent Application Publication No. 2005/0248184 discloses a vehicle having a pneumatically inflatable portion that forms an exterior surface of the body of the vehicle. The pneumatically inflatable structure is provided to protect vehicles from being damaged by other vehicles.

The above prior art patents and publications fail to disclose a simple and effective air bag device that is deployed through the weld seam formed between the roof and side body structures of a vehicle from a storage location below the vehicle roof which is deployed through the roof and either above the roof or outboard of the roof rail area of the vehicle. The manner in which Applicants' invention provides such a solution is summarized below.

SUMMARY OF THE INVENTION

According to one aspect of the present invention, an exterior deployed air bag system is disclosed for an automotive vehicle having a roof. The air bag system comprises an air bag assembly that is attached to the vehicle below the roof. The air bag assembly has an air bag that is stored in an uninflated condition in a housing. The air bag assembly further includes an inflator that is operatively connected to the air bag to selectively inflate the air bag. The roof defines an access opening and the air bag assembly is attached to the roof at the access opening. A closure member is provided that has a closed position in which the closure member closes the access opening in an open position in which the closure member opens the closure member. A sensor generates an actuation signal in response to sensing that the vehicle is at substantial risk of rolling onto the roof. A controller receives the actuation signal and actuates the inflator to supply a volume of gas to the air bag, wherein the air bag opens the closure member, passes through the access opening, and expands outside of the roof.

According to another aspect of the present invention, a protection system for an automotive vehicle having a passenger compartment that is covered by a roof and right and left sides that are joined to the roof at two spaced weld seam areas. The protection system comprises at least one inflator assembled to the roof proximate each of the weld seam areas. A selectively openable access opening is provided in each of the weld seam areas. At least one air bag is operatively assembled to each of the inflators. Each air bag is stored in an uninflated condition below the roof and proximate one of the weld seams. A controller controls the inflators and is actuated by a sensor that senses the vehicle's rolling onto the roof and provides a signal to the controller. The controller receives a signal from the actuator and actuates the inflators. The inflators fill the air bags with a gas to deploy the air bags through the access openings.

According to other aspects of the invention, the access openings may be provided in the weld seam areas. A plurality of access openings may be provided in the weld seam areas and at least one of the air bag assemblies may be attached to each of the access openings to pass through the access opening and expand outside the roof.

According to other aspects of the invention, the sensor may comprise a switch that generates the actuation signal when the vehicle moves from a normal position with the wheels on the ground to an abnormal position in which one or more of the set of wheels is spaced from the ground.

According to other aspects of the invention, the air bag may expand outside the roof and absorb kinetic energy as the vehicle begins to roll over onto the roof of the vehicle. The air bags may also provide an obstacle to inhibit the vehicle from rolling onto the roof. The air bag may be expanded outside of the roof to provide a buffer between the roof and the ground. The air bag assembly may be assembled to at least one of the access openings and may have two air bags with one air bag expanding over the roof and one air bag expanding outboard of the side assembly of the vehicle.

These and other aspects of the present invention will be better understood in view of the attached drawings and the following detailed description of the illustrated embodiment.

DETAILED DESCRIPTION OF THE PREFERRED EMBODIMENT(S)

Figure 1:
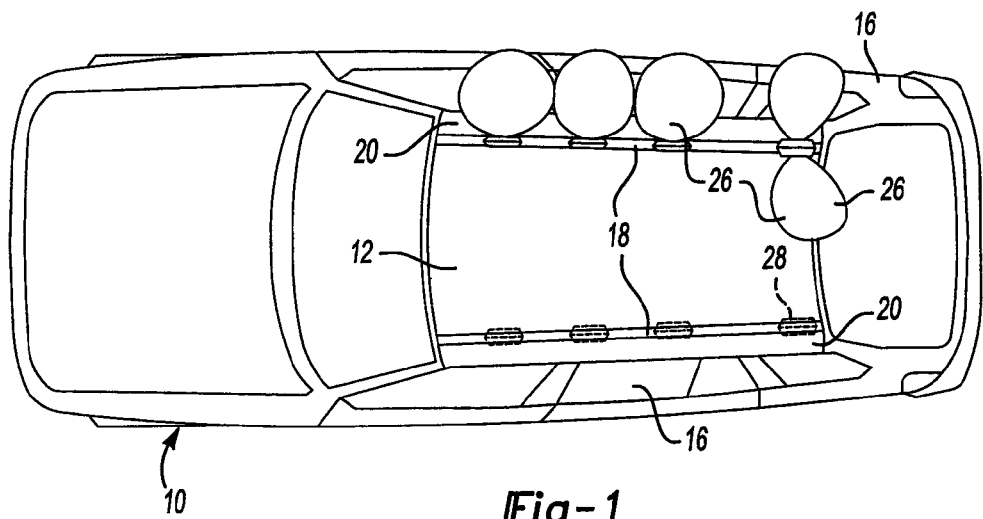
FIG. 1 is a plan view of a vehicle equipped with air bags that are deployed through the weld seam formed between the roof and side assembly with the air bags deployed on one side for purposes of illustration.

Referring to FIG. 1, a vehicle 10 is illustrated that includes a roof 12 that is assembled on opposite sides to two side assemblies 16. A weld seam 18 is provided in which the roof 12 is welded to each of the side assemblies 16. The weld seam 18 is provided between the roof rail area 20 of each of the side assemblies 16 and the roof 12. In FIG. 1, a plurality of deployed air bags 26 are shown in their deployed condition on one side of the vehicle. A plurality of stored air bags 28 are shown on the opposite side of the vehicle in their stored condition for purposes of illustration.

Figure 2:
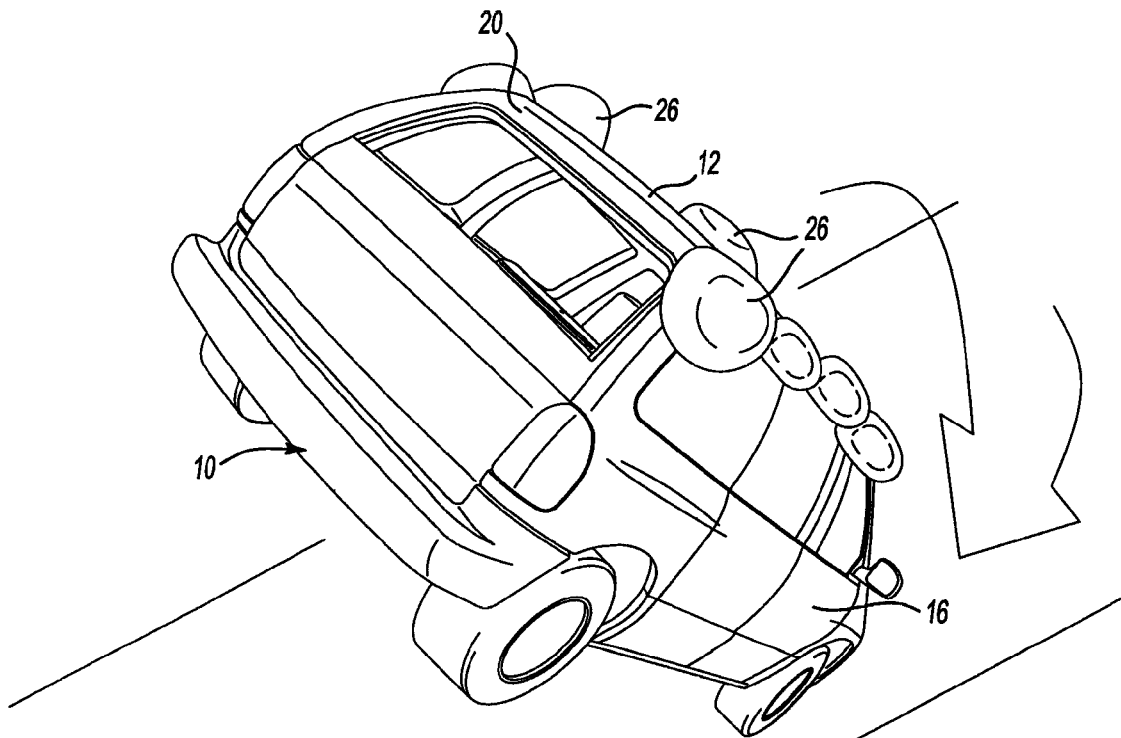
FIG. 2 is a perspective view of a vehicle in a rollover collision event with the air bags deployed.

Referring to FIG. 2, the vehicle 10 is shown in the course of a rollover collision event. The vehicle 10 is shown with a plurality of deployed air bags 26 deployed near the roof rail area 20 and extending over the roof 12 and the side assembly 16. According to the concept of the present invention, the deployed air bags 26 are intended to reduce the severity of a rollover. With the air bags deployed, it is believed that the deployed air bags 26 may inhibit continued rolling of the vehicle when the deployed air bags 26 contact the ground. When the deployed air bags 26 are fully inflated, they become relatively rigid. When the air bags contact the ground, the air bags are intended to absorb kinetic energy and potentially slow the rotation of the vehicle 10. The deployed air bags 26 may reduce the impact force of the ground on the roof 12 and roof rail area 20.

Figure 3:
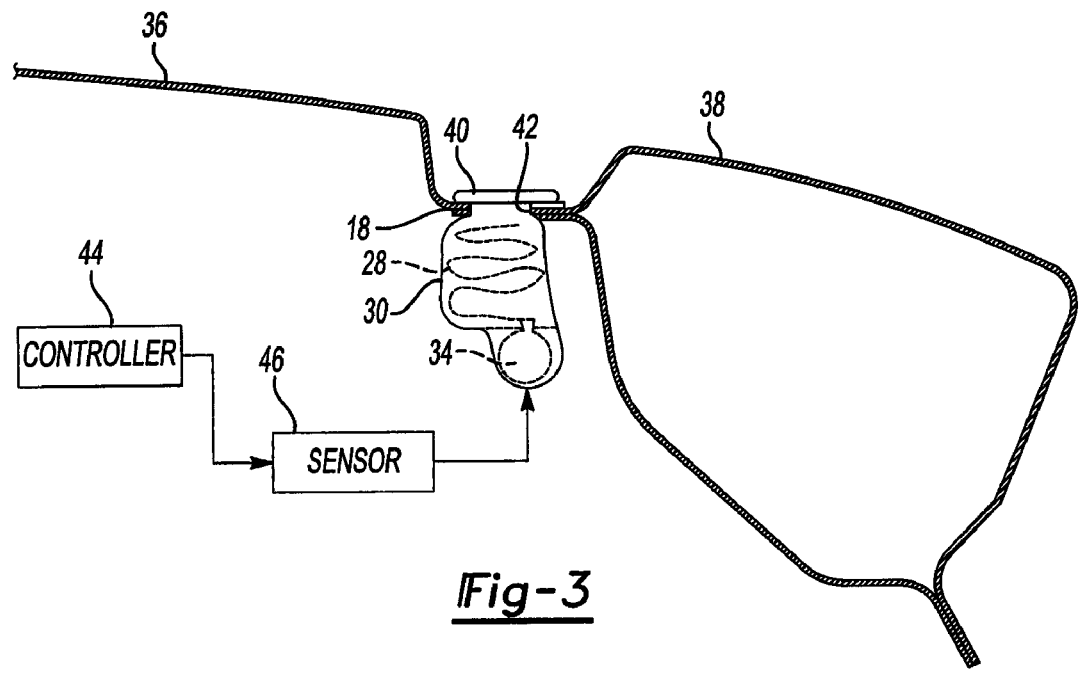
FIG. 3 is a fragmentary cross-sectional view of an air bag assembled to the weld seam between a roof outer panel and a roof rail beam in its stored condition.

Referring to FIG. 3, an air bag housing 30 is shown assembled to the lower side of the weld seam 18. A stored air bag 28 is shown in phantom in FIG. 3 within an air bag housing 30. The air bag housing 30 also houses an inflator that is shown in phantom at 34. The air bag housing 30 may be assembled to the weld seam 18 where the roof outer panel 36 is welded to the roof rail beam 38. A cover 40 may be provided on the upper surface of the weld seam 18 to cover the stored air bag 28 and air bag housing 30. The cover 40 seals the opening 42 formed in the weld seam 18 to exclude moisture, dirt, and debris from entering the air bag housing 30. The inflator 34 is actuated when sensors 44 detect an impending rollover event. The sensors 44 may comprise one or more accelerometers, strain gauges, or position sensing sensors such as those that are commonly provided for sensing collision events for conventional air bag systems. The sensors 44 provide output signals to a controller 46 that control actuation of the inflator 34.

Figure 4:
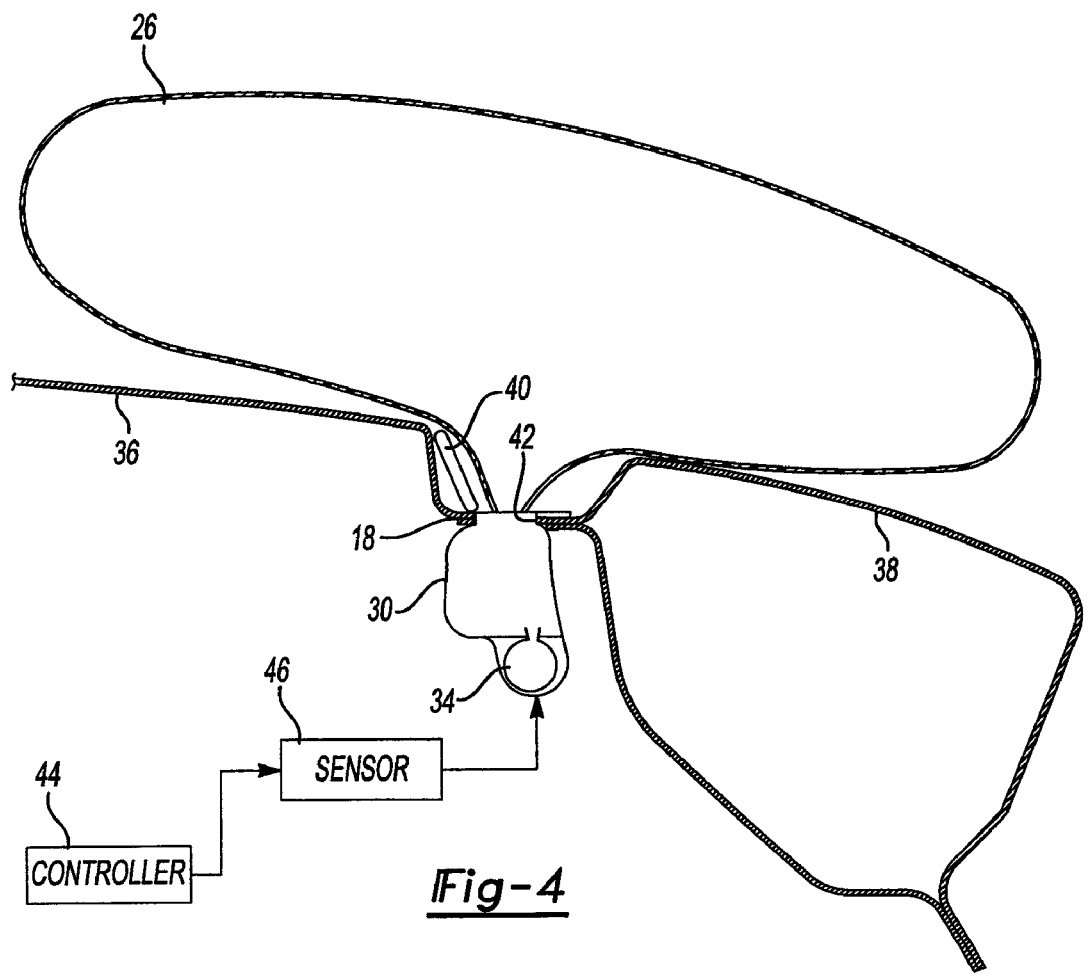
FIG. 4 is a fragmentary cross-sectional view similar to FIG. 3 with the air bag in its deployed or inflated condition.

Referring to FIG. 4, a deployed air bag 26 is shown deployed through the opening 42 in the weld seam 18. As shown in FIG. 4, the sensor 44 provides a signal to the controller 46 to actuate the inflator 34. The inflator 34 rapidly inflates the stored air bag 28 causing it to be deployed as a deployed air bag 26 as shown. The deployed air bag may extend over the roof outer panel 36 and/or the roof rail beam 38. The cover 40 is open to permit the deployed air bag 26 to pass through the opening 42. At this point, the air bag housing 30 no longer contains the stored air bag 28. The deployed air bag 26 may absorb energy if the vehicle 10 rolls over when the deployed air bag 26 contacts the ground or other object. When contact is made with the ground or other object, the deployed air bag 26 absorbs the kinetic energy of the moving vehicle and may reduce the severity of the impact with the roof outer panel 36 and the roof rail beam 38.

While the best mode for carrying out the invention has been described in detail, those familiar with the art to which this invention relates will recognize various alternative designs and embodiments for practicing the invention as defined by the following claims.

What is claimed is:

1. An exterior deployed air bag system for an automotive vehicle having a roof, the air bag system comprising:
   an air bag assembly that is attached to the vehicle below the roof, the air bag assembly having an air bag that is stored in an uninflated condition in a housing, and wherein the air bag assembly further includes an inflator that is operatively connected to the air bag to selectively inflate the air bag;
   wherein the roof defines an access opening and the air bag assembly is attached to the roof at the access opening;
   a closure member that has a closed position in which the closure member closes the access opening and an open position in which the closure member opens the access opening;
   a sensor generates an actuation signal in response to sensing that the vehicle is at substantial risk of rolling onto the roof;
   a controller receives the actuation signal and actuates the inflator to supply a volume of gas to the air bag, wherein the air bag opens the closure member, passes through the access opening and expands outside of the roof wherein the vehicle further comprises a right side assembly and a left side assembly and wherein right and left weld seam areas are provided between the roof and each of the right side assembly and left side assembly, and wherein the access opening is disposed in at least one of the weld seams.

2. The air bag system of claim 1 wherein a plurality of access openings are provided that are disposed in the weld seams and at least one of the air bag assemblies is attached to each of the access openings.

3. The air bag system of claim 1 wherein the sensor is a switch that generates the actuation signal when the vehicle moves from a normal position with a set of wheels on the ground to an abnormal position in which one or more of the set of wheels is spaced from the ground.

4. The air bag system of claim 1 wherein the air bag expands outside of the roof and absorbs kinetic energy as the vehicle begins to roll over onto the roof of the vehicle.

5. The air bag system of claim 1 wherein the air bag expands outside of the roof to provide an obstacle to inhibit the vehicle rolling over onto the roof.

6. The air bag system of claim 1 wherein the air bag expands outside of the roof to provide a buffer between the roof and the ground.

7. An exterior deployed air bag system for an automotive vehicle having a roof, the air bag system comprising:
   an air bag assembly that is attached to the vehicle below the roof, the air bag assembly having an air bag that is stored in an uninflated condition in a housing, and wherein the air bag assembly further includes an inflator that is operatively connected to the air bag to selectively inflate the air bag;
   wherein the roof defines an access opening and the air bag assembly is attached to the roof at the access opening;
   a closure member that has a closed position in which the closure member closes the access opening and an open position in which the closure member opens the access opening;
   a sensor generates an actuation signal in response to sensing that the vehicle is at substantial risk of rolling onto the roof;
   a controller receives the actuation signal and actuates the inflator to supply a volume of as to the air bag, wherein the air bag opens the closure member, passes through the access opening and expands outside of the roof wherein the vehicle further comprises a right side assembly and a left side assembly and wherein right and left weld seam areas are provided between the roof and each of the right side assembly and left side assembly, and wherein the access opening is disposed in at least one of the weld seams;

wherein the air bag assembly assembled to at least one of the access openings has two air bags, with one air bag expanding over the roof and one air bag expanding outboard of the side assembly of the vehicle.

8. A protection system for an automotive vehicle having a passenger compartment that is covered by a roof and that has right and left sides that are joined to the roof at two spaced weld seam areas, the protection system comprising:

at least one inflator assembled to the roof proximate each of the weld seam areas, wherein each of the weld seam areas defines an access opening that is selectively openable;

at least one air bag operatively assembled to each of the inflators, wherein each air bag is stored in an uninflated condition below the roof and proximate one of the weld seams;

a controller that controls the inflators;

a sensor that senses that the vehicle is rolling onto the roof and provides a signal to the controller;

wherein the controller receives the signal from the sensor and actuates the inflators; and wherein the inflators fill the air bags with a gas to deploy the air bags through the access openings to resist forces tending to cause the vehicle to roll onto the roof.

9. The protection system of claim 8 wherein the right and left sides of the vehicle further comprise a right side assembly and a left side assembly and wherein one of the two spaced weld seam areas are provided between the roof and each of the right side assembly and left side assembly.

10. The protection system of claim 8 wherein the access opening is disposed in at least one of the two spaced weld seam areas.

11. The protection system of claim 8 wherein the access openings are disposed in the weld seams and at least one of the air bag assemblies is attached below each of the access openings, wherein each of the air bags is adapted to pass through one of the access openings and expand outside of the roof.

12. The protection system of claim 8 wherein the sensor is a switch that generates the actuation signal when the vehicle moves from a normal position with a set of wheels on the ground to an abnormal position in which one or more of the set of wheels is spaced from the ground.

13. The protection system of claim 8 wherein the air bag expands outside of the roof and absorbs kinetic energy as the vehicle begins to roll over onto the roof of the vehicle.

14. The protection system of claim 8 wherein the air bag expands outside of the roof to provide an obstacle to inhibit the vehicle rolling over onto the roof.

15. The protection system of claim 8 wherein the air bag expands outside of the roof to provide a buffer between the roof and the ground.

16. The protection system of claim 8 wherein the air bag assembly is assembled to at least one of the access openings and has two air bags, with one air bag expanding over the roof and one air bag expanding outboard of one of the sides of the vehicle.

* * * * *